United States Patent [19]

Cheng

[11] 4,013,420
[45] Mar. 22, 1977

[54] CARBON BLACK REACTOR
[75] Inventor: Paul J. Cheng, Bartlesville, Okla.
[73] Assignee: Phillips Petroleum Company, Bartlesville, Okla.
[22] Filed: May 23, 1975
[21] Appl. No.: 580,383
[52] U.S. Cl. .............................. 23/259.5; 423/456
[51] Int. Cl.² ...................... C09C 1/48; C09C 1/50
[58] Field of Search ... 23/259.5; 423/450, 455–458
[56] References Cited

UNITED STATES PATENTS

| | | | |
|---|---|---|---|
| 3,490,869 | 1/1970 | Heller | 23/259.5 X |
| 3,523,757 | 8/1970 | Knight | 23/259.5 |

*Primary Examiner*—R.E. Serwin
*Assistant Examiner*—Roger F. Phillips

[57] ABSTRACT

An O-type carbon black reactor is disclosed comprising a precombustion chamber, at least one of the upstream and downstream confining walls thereof being provided with protrusions being arranged and shaped such as to destroy the inwardly spiraling boundary layer flow of the hot combustion gases and to convert this flow into turbulent flow.

4 Claims, 5 Drawing Figures

CARBON BLACK REACTOR

This invention relates to the production of carbon black. More particularly, the invention relates to a carbon black reactor. Specifically, this invention relates to an 0-type carbon black reactor.

BACKGROUND OF THE INVENTION

Carbon black can be produced in various ways. One particularly successful way is to pyrolytically decompose hydrocarbon feedstocks that are gaseous or liquid under normal pressure and temperature conditions in a furnace. The heat for this thermal decomposition is usually generated by hot combustion gases, e.g., by the combustion products of natural gas and air. One furnace that has proven to be very efficient is the socalled 0-type carbon black reactor. This reactor has a precombustion section of greater diameter than the diameter of the reaction section, and is in axial alignment and in open communication with the reaction section. Whereas such a reactor has proven to be very successful in producing high quality carbon black, the specifications carbon black has to meet become more and more severe and more and more difficult to comply with. Particularly, it would be advantageous to have an 0-type carbon black reactor available that can produce carbon black with high tint or with narrow particle size distribution without having to sacrifice other valuable properties of the carbon black such as the surface area.

THE INVENTION

It is thus one object of this invention to provide a new carbon black reactor.

Another object of this invention is to provide an 0-type carbon black reactor for the production of high quality carbon black.

A further object of this invention is to provide a new 0-type carbon black reactor in which carbon black having a high tint value or a narrow particle size distribution can be produced.

In accordance with this invention it has now been found that by providing at least one of the upstream and downstream confining walls of the precombustion section of an 0-type carbon black reactor with protrusions, the turbulence of the flow of hot combustion gases is increased which leads to a more uniform or narrower particle size distribution of the carbon black.

More specifically, there is now provided a carbon black reactor comprising an essentially cylindrically shaped precombustion section confined by an upstream wall, a cylindrical wall, and a downstream wall; turbulence-creating protrusions on at least one of said upstream and downstream walls, said protrusions being arranged and shaped such as to at least partially destroy the inwardly spiraling boundary layer flow of hot combustion gases along said walls to convert at least some of the spiraling flow into turbulent flow; in axial alignment and open communication with said precombustion section a reaction section having an upstream inlet opening in said downstream wall of smaller diameter than the internal diameter of said cylindrical wall; first conduit means attached to the reactor for the axial introduction of hydrocarbon feed into the reactor; second conduit means attached to the precombustion section for the tangential introduction of hot combustion gas into the precombustion section and third conduit means for withdrawal of carbon black-containing gas attached to the downstream end of the reaction section.

In accordance with one embodiment of this invention, the protrusions are ridges extending in directions essentially orthogonally to the direction the flow of hot combustion gases along said walls would take without said protrusions being present; preferably, these ridges extend essentially in radial direction along at least one of said walls. These ridges preferably have a depth or height in an axial direction of not more than about one-tenth of the axial length of the precombustion chamber. Preferably 6 to 10 of such ridges are provided for.

In accordance with a further embodiment of this invention, said protrusions are a plurality of rods protruding from said wall or said walls. These rods can be arranged in circles around the axis of the reactor or the rods can be randomly distributed over the wall surface. The rods protruding in axial direction from said wall or walls generally have an axial length of not more than about one-tenth of the axial length of the precombustion chamber. The rods preferably have a circular cross section. The average diameter of these rods is less than about one twenty-fifth the diameter of the precombustion section.

The reactor of this invention can be any 0-type reactor. The reactor comprises essentially two sections, namely, a precombustion section and a reaction section. The precombustion section is defined by an upstream wall, a cylindrical wall and a downstream wall. The upstream and the downstream wall generally are circular plane walls and, in accordance with the present invention, on one or both of these walls the protrusions are located causing the inwardly spiraling boundary layer flow of the hot combustion gases to be converted into turbulent flow.

The reaction section of the reactor, generally speaking, is a cylindrical section having a smaller diameter than the internal diameter of the precombustion section. The reaction section can have chokes arranged therein. It is also possible that the reaction section is venturi-shaped. The upstream opening of the venturi-shaped reaction section is smaller than the internal diameter of the precombustion section.

The reactor can be provided with an axial zone. This axial zone is in open alignment and axial communication with the precombustion section upstream thereof. Such an axial zone increases the mixing of the hydrocarbon feed with the hot combustion gases and thus can effect production of higher structure (dibutylphthalate) value carbon black than that produced absent the axial zone. It is, however, also within the scope of this invention to arrange the protrusions on one of the walls of the precombustion chamber of a reactor having no axial section, in other words, a reactor the upstream end of which is the upstream confining wall of the precombustion section.

The invention will be more fully understood from the following detailed description of the drawings showing preferred embodiment of this invention.

Figure 1:
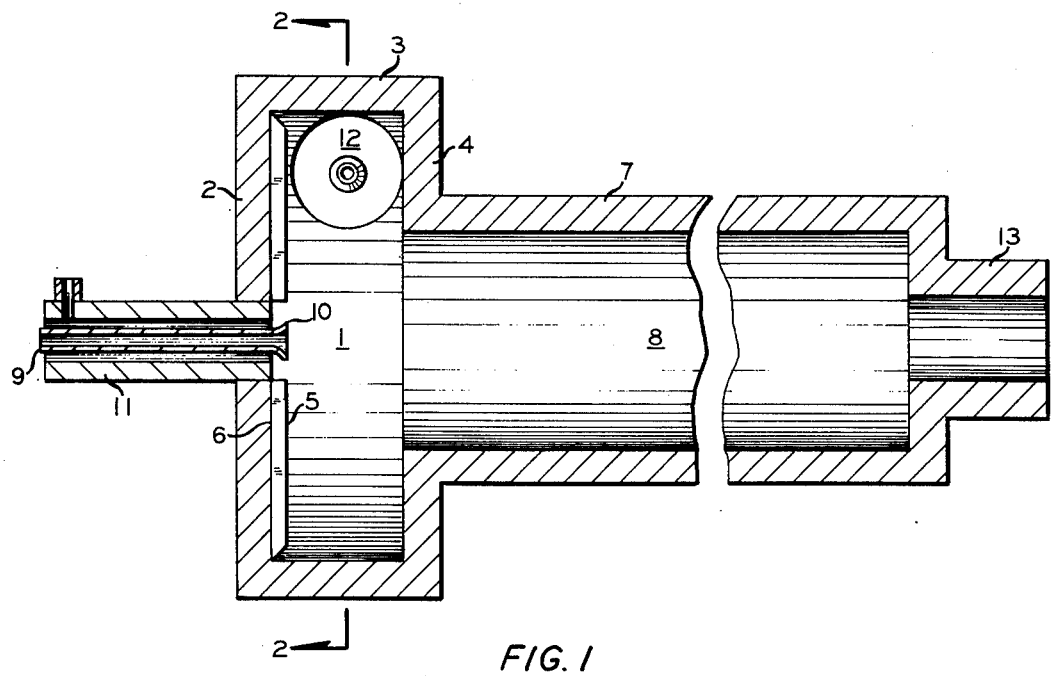
FIG. 1 is an elevation in view of one embodiment of this invention.
Figure 2:
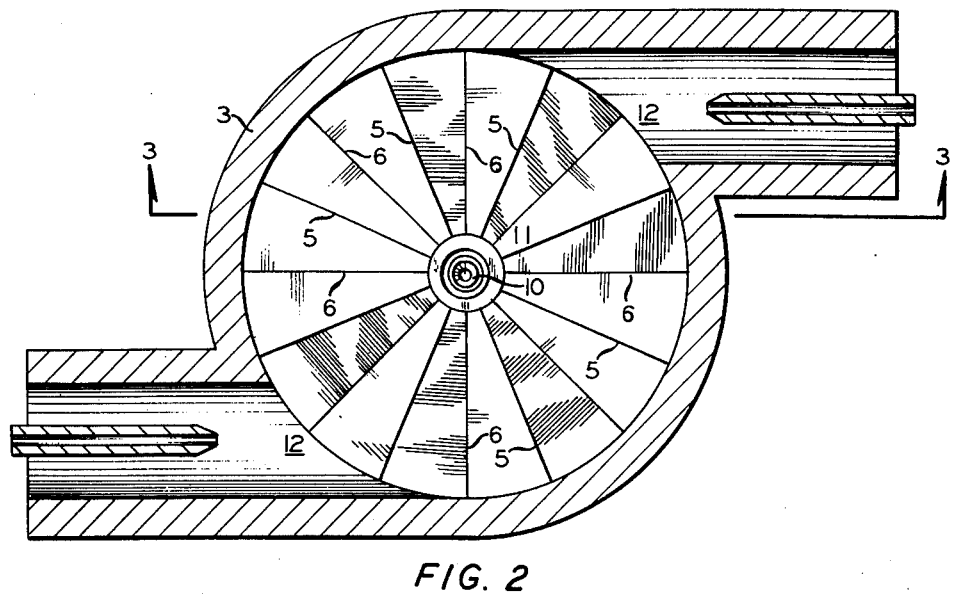
FIG. 2 is a sectional view through 2—2 of FIG. 1.
Figure 3:
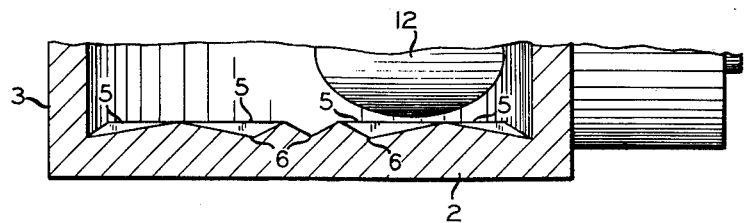
FIG. 3 is a sectional view through 3—3 of FIG. 2.

FIGS. 1, 2 and 3 show a carbon black reactor in accordance with this invention. The carbon black reactor is confined by walls made of conventional refractory material such as mullite or alumina. The precombustion section 1 is confined by an upstream wall 2, a cylindrical wall 3, and a downstream wall 4. These three walls together define an essentially cylindrically shaped precombustion section. On the internal side of the upstream wall 2 of the precombustion section 1, ridges 5 are arranged which have an essentially triangular cross-sectional shape and which extend with their summit line essentially radially outwardly. Between the ridges 5, valleys 6 are formed, the valley line of which also extends essentially radially outwardly.

Attached to the wall 4 is a cylindrically shaped wall 7 which confines the reaction section 8. Through the conduit 9 and a nozzle 10 a liquid hydrocarbon feed can be axially introduced into the reactor. Surrounding the conduit 9 is a conduit 11 along which a small quantity of air is introduced such as to prevent excessive heating of the conduit 9 and the nozzle 10.

Through the opening 12 hot combustion gases are tangentially introduced into the precombustion chamber. These gases can either be produced shortly before they reach the reactor or a gas stream can be introduced tangentially through the opening 12 together with air, this gas stream being ignited inside of the precombustion chamber. In any event, a stream of tangentially moving hot combustion gases is generated inside of the precombustion chamber 1. This stream of hot combustion gases moved in a spiraling movement radially inwardly into contact with the hydrocarbon feed. The mixture of the hydrocarbon feed and the hot combustion gases then reacts to pyrolytically decompose the hydrocarbon feed into carbon black in the reaction zone 8. From a carbon black withdrawal conduit 13, carbon black-containing gas or smoke is withdrawn from the reactor.

The hot combustion gases moving close to the confining wall 2 are converted into a turbulent gas stream by the ridges 5. These ridges are arranged essentially in perpendicular direction to the direction of movement of the gases and thus gas vortices are created. Thus, the mixing efficiency is increased and the particle distribution is rendered more narrow.

Figure 4:
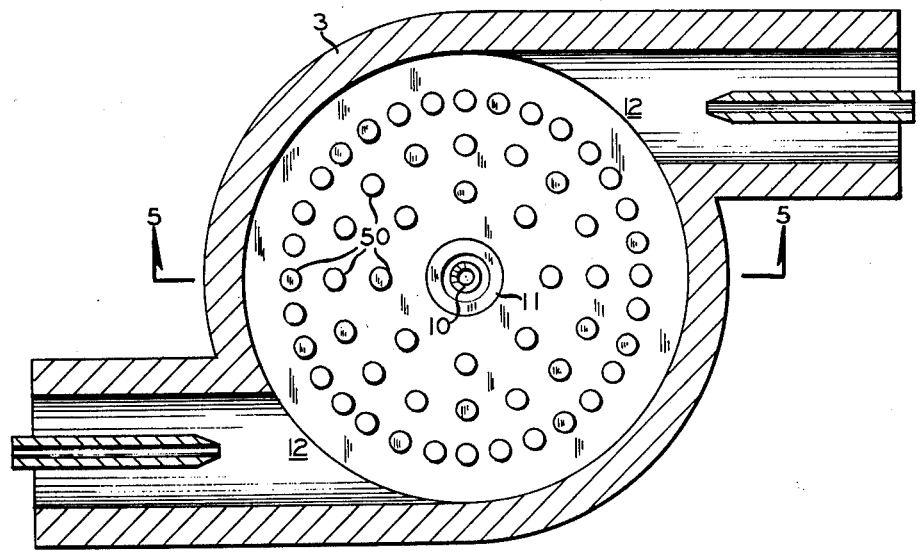
FIG. 4 is a view similar to FIG. 2 showing another embodiment of this invention.
Figure 5:
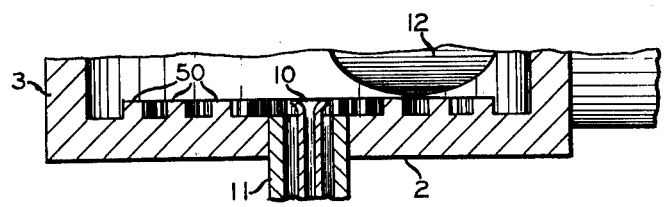
FIG. 5 is a sectional view through 5—5 of FIG. 4.

A further embodiment of this invention is shown in FIGS. 4 and 5. In this case, instead of the ridges 5 and 6, rods 50 are attached to the upstream confining wall 2 of the precombustion chamber. These rods 50 have essentially the same effect as the ridges 5, namely to convert the inwardly spiraling boundary layer flow of the hot combustion gases close to the confining wall 2 into a turbulent flow.

In the following, specific dimensions for the reactor and the protrusions are given:

| Precombustion Zone: | |
|---|---|
| Diameter, inches | 36 (91.4 cm.) |
| Length, inches | 12 (30.5 cm.) |
| Reaction Zone: | |
| Diameter, inches | 12 (30.5 cm.) |
| Protrusions on Downstream Confining Wall: | |
| Rods (spaced about 2 inches (5.1 cm.) apart) | |
| Diameter, inches | 1 (2.5 cm.) |
| Length, inches | 1 (2.5 cm.) |

I claim:
1. In a carbon black reactor comprising:
a. an essentially cylindrically shaped precombustion section confined by an upstream wall, a cylindrical wall and a downstream wall;
b. in axial alignment and open communication with said precombustion section a reaction section having an upstream inlet opening in said downstream wall of smaller diameter than the diameter of said cylindrical wall;
c. first conduit means attached to the reactor for the axial introduction of the hydrocarbon feed into the reactor;
d. second conduit means attached to the precombustion section for the tangential introduction of hot combustion gases into the precombustion section;
e. third conduit means for the withdrawal of carbon black-containing gas attached to the downstream end of the reaction section;
the improvement comprising
f. turbulence-creating protrusions attached to at least one of said upstream and downstream walls confining said precombustion section, said protrusions being arranged and shaped such as to at least partially destroy the inwardly spiraling boundary layer flow of the hot combustion gases that would exist without these protrusions and convert it into turbulent flow.

2. A reactor in accordance with claim 1 wherein said protrusions are ridges arranged extending essentially radially along the wall or walls.

3. A reactor in accordance with claim 1 wherein said protrusions are a plurality of rods extending essentially in axial direction from at least one of said walls.

4. A reactor in accordance with claim 3 wherein said rods are arranged in a concentric pattern surrounding the axis of said reactor.

* * * * *